Patented Feb. 22, 1938

2,109,400

UNITED STATES PATENT OFFICE 2,109,400

ESTERS OF TESTOSTERONE AND PROCESS OF MAKING SAME

Karl Miescher, Riehen, near Basel, and Albert Wettstein and Caesar Scholz, Basel, Switzerland, assignors to the firm of Society of Chemical Industry in Basle, Basel, Switzerland No Drawing. Application September 8, 1936, Serial No. 99,856. In Switzerland October 5, 1935

16 Claims. (Cl. 260—106)

This invention relates to the manufacture of new esters of saturated or unsaturated oxyketones of the type of androstane-3-one-17-ol by treating the oxyketone with an acylating agent having more than two carbon atoms and containing in addition to the acylating group no group having a tendency to form salt or group capable of conversion into a salt-forming group.

As compared with testosterone and testosterone-acetate the new esters are characterized by their protractive effect. Esters derived from medium fatty acids, from propionic acid onwards, have proved to have a particularly strong efficacy in tests on rats.

For the acylation either the free acid itself or its anhydride, halide or ester derived from a lower alcohol may be used. Suitable acid components are, for instance, propionic acid, butyric acids, valerianic acids, capric acid, benzoic acid, crotonic acid or the like.

The following oxyketones are examples of the parent materials: testosterone ($\Delta^{4,5}$-androstene-3-one-17-ol), dihydrotestosterone (androstene-3-one-17-ol), 17-methyl-testosterone ($\Delta^{4,5}$-17-methyl-androstene-3-one-17-ol), 17-methyldihydrotestosterone (17-methyl-androstane-3-one-17-ol).

The new products have been tested biologically by the following methods:—

(A) Castrated rats received on the 1st and 6th experimental days each 1 mg. of the compound to be investigated. On the 16th or 21st day the rates were killed and the weight of the seminal vesicles were ascertained.

(B) Castrated rats received on the 1st experimental day 2 mgs. of the compound to be investigated. On the 6th and 11th days the rats were killed and the weights of the seminal vesicles were ascertained.

The following table shows the particularly high activity of the new products as compared with the known testosterone, its acetate and the dihydrotestosterone:—

| Compounds investigated | Weight of seminal vesicle of the rat in mg. | | | |
|---|---|---|---|---|
| | Method A | | Method B | |
| | 16 days | 21 days | 6 days | 11 days |
| Testosterone | 15 | 14 | 18 | 14 |
| Dihydrotestosterone | 15 | 14 | 18 | 14 |
| 17-methyl-testosterone | 16 | 14 | 27 | 17 |
| 17-methyl-dihydrotestosterone | 16 | 14 | 25 | 16 |
| Testosterone-formate | 61 | 46 | 86 | 35 |
| Testosterone-acetate | 89 | 33 | 93 | 41 |
| Testosterone-propionate | 285 | 106 | 101 | 265 |
| Testosterone-n-butyrate | 375 | 320 | 130 | 306 |
| Testosterone-iso-butyrate | 334 | 135 | 150 | 312 |
| Testosterone-n-valerianate | 400 | 514 | 140 | 235 |
| Testosterone-caprinate | 165 | 190 | 58 | 97 |
| Testosterone-benzoate | 113 | 170 | 70 | 75 |
| Dihydrotestosterone-formate | | | 75 | 40 |
| Dihydrotestosterone-acetate | | | 85 | 35 |
| Dihydrotestosterone-propionate | | | 90 | 230 |

The new esters are applicable in therapeutics.

The following examples illustrate the invention, the parts being by weight:—

Example 1

1 part of testosterone is dissolved in 4 parts of dry pyridine and the solution is heated with 1.5 parts of propionic acid anhydride for 1½ hours at 125° C. The whole is then poured into water and allowed to stand for some time during which crystallization occurs. The crystalline mass is filtered by suction, washed with water, dried over phosphorous pentoxide and re-crystallized from hexane; colourless testosterone propionate is thus obtained of melting point 121–123° C.

The reaction may occur in the presence of another tertiary base or even in the absence of such a base.

Example 2

A solution of 1 part of testosterone in 4 parts of pyridine is heated with 2 parts of n-butyric acid anhydride in an oil bath at 125° C. for 1½ hours. Water is then added and the mixture allowed to stand for a long time during which crystallization occurs. The crystals are filtered by suction, washed with water and dried over phosphorus pentoxide. When re-crystallized from hexane or dilute methanol the product yields testosterone-n-butyrate in the form of slender needles which melt at 111–113° C.

Example 3

1 part of testosterone is dissolved in 3 parts of dry pyridine and the solution is heated together with 2 parts of iso-butyric acid anhydride at 125° C. for 2½ hours. The mass is then poured into warm water and stirred somewhat; after a short time crystallization begins. The crystals are filtered by suction, washed with water and dried over phosphorus pentoxide. After recrystallization from hexane or dilute acetone testosterone-iso-butyrate is obtained in the form of thick needles of melting point 134–136° C.

Example 4

A solution of 1 part of testosterone in 3 parts of dry pyridine is mixed in the cold with 1 part of n-valerianic acid chloride and the whole is allowed to remain at room temperature for a long time. The mass, which is partially solidified, is then poured into strongly diluted sulfuric acid, extracted with ether and the ethereal solution is washed with dilute sulfuric acid, sodium carbonate solution and water. On evaporation of the solution and crystallization of the residue from hexane and dilute acetone there is obtained testosterone-n-valerianic acid ester of melting point 109–111° C.

Instead of valerianic acid chloride another halide of the acid may be used, for instance bromide.

In like manner, one can obtain the iso-valerianic acid ester of melting point 138–139.5° C.

*Example 5*

Equal parts of testosterone and capric acid are heated together in an atmosphere of nitrogen for 3 hours at 200° C. The mass is then taken up with ether, the ethereal solution being washed with sodium carbonate solution and water and then evaporated. The residue which crystallizes after standing for some time is re-crystallized from absolute alcohol or aqueous methyl alcohol so as to obtain the testosterone capric acid ester of melting point 55–57° C.

In quite analogous manner for example the esters of capronic acids, oenanthic acids, caprilic acids, pelargonic acids and the like may also be obtained.

*Example 6*

1.44 parts of testosterone is dissolved in absolute pyridine and to this solution 1 part of benzoyl chloride is added. The mixture is allowed to stand for several hours and then poured into dilute sulfuric acid; the mass is then extracted with ether and the ethereal extract is washed repeatedly with dilute acid, dilute caustic soda solution and finally water. The residue of the dried ether solution is purified by re-crystallization from hexane or by sublimation in a high vacuum or by both methods of purification, whereby the testosterone benzoate of melting point 198–200° C. is obtained.

17-alkyl-testosterones such as, for example, the 17-methyl compound or the 17-ethyl compound are esterified in analogous manner, for example the propionates, butyrates, valerianates, benzoates and the like are produced as crystalline compounds.

*Example 7*

5 parts of dihydrotestosterone are mixed with 15 parts of dry pyridine and 5 parts of propionic acid anhydride and the mixture is heated for 1½ hours at about 100° C., the solution remaining nearly colourless. The whole is then poured into water and allowed to stand for some time during which crystallization immediately sets in. The crystalline mass is filtered by suction, washed with water and dried over phosphorus pentoxide, whereafter by re-crystallization from hexane dihydrotestosterone-propionate is obtained of melting point 120–121° C.

Instead of pyridine another tertiary base, for instance dimethylaniline may be used.

In quite analogous manner the butyric acid ester of melting point 91–92° C., and the n-valerianic acid ester and other esters may be obtained.

17-alkyl-dihydrotestosterones such as, for example, the 17-methyl compound or the 17-ethyl compound are esterified in analogous manner, for example the propionates, butyrates, valerianates, benzoates and the like are produced as crystalline compounds.

In like manner there may be made, for instance androstane-3-one-17-trans-ol-hexa-hydrobenzoate of melting point 165–166° C. and androstane-3-one-17-cis-ol-hexahydrobenzoate of melting point 136–137° C.,

What we claim is:—

1. The 3-keto-cyclopentanopolyhydrophenanthrenes containing in 17-position the group

wherein R is a member of the group consisting of hydrogen and a lower aliphatic hydrocarbon radical, and Ac stands for an unsubstituted monocarboxylic acid radical containing more than two carbon atoms.

2. The 3-keto-cyclopentanopolyhydrophenanthrenes containing in 17-position the group

wherein R is a member of the group consisting of hydrogen and a lower aliphatic hydrocarbon radical, and Ac stands for an unsubstituted aliphatic monocarboxylic acid radical containing more than two carbon atoms.

3. The 3-keto-cyclopentanopolyhydrophenanthrenes containing in 17-position the group

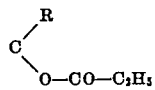

wherein R is a member of the group consisting of hydrogen and a lower aliphatic hydrocarbon radical.

4. The 3-keto-cyclopentanopolyhydrophenanthrenes containing in 17-position the group

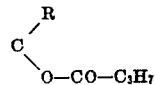

wherein R is a member of the group consisting of hydrogen and a lower aliphatic hydrocarbon radical.

5. The 3-keto-cyclopentanopolyhydrophenanthrenes containing in 17-position the group

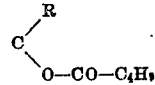

wherein R is a member of the group consisting of hydrogen and a lower aliphatic hydrocarbon radical.

6. The testosterone propionate of the formula

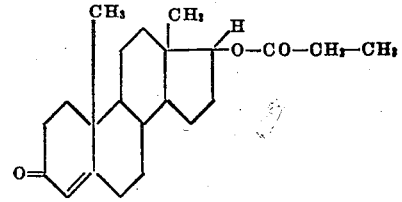

of melting point 121–123° C.

7. A process for the manufacture of esters of the 3-keto-cyclopentanopolyhydrophenanthrenes containing in 17-position the group

wherein R is a member of the group consisting of hydrogen and a lower aliphatic hydrocarbon radical, consisting in treating the said 3-keto-cyclopentanopolyhydrophenanthrenes with agents capable of introducing unsubstituted monocarboxylic acid radicals containing more than two carbon atoms.

8. A process for the manufacture of esters of the 3-keto-cyclopentanopolyhydrophenanthrenes containing in 17-position the group

wherein R is a member of the group consisting in hydrogen and a lower aliphatic hydrocarbon radical, consisting in treating the said 3-keto-cyclopentanopolyhydrophenanthrenes with aliphatic agents capable of introducing unsubstituted monocarboxylic acid radicals containing more than two carbon atoms.

9. A process for the manufacture of propionates of the 3-keto-cyclopentanopolyhydrophenanthrenes containing in 17-position the group

wherein R is a member of the group consisting of hydrogen and a lower aliphatic hydrocarbon radical, consisting in treating the said 3-keto-cyclopentanopolyhydrophenanthrenes with propionylating agents.

10. A process for the manufacture of butyrates of the 3-keto-cyclopentanopolyhydrophenanthrenes containing in 17-position the group

wherein R is a member of the group consisting of hydrogen and a lower aliphatic hydrocarbon radical, consisting in treating the said 3-keto-cyclopentanopolyhydrophenanthrenes with butyrylating agents.

11. A process for the manufacture of valerianates of the 3-keto-cyclopentanopolyhydrophenanthrenes containing in 17-position the group

wherein R is a member of the group consisting of hydrogen and a lower aliphatic hydrocarbon radical, consisting in treating the said 3-keto-cyclopentanopolyhydrophenanthrenes with valerianylating agents.

12. A process for the manufacture of testosterone-propionate of the formula

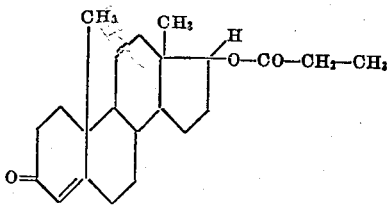

wherein testosterone of the formula

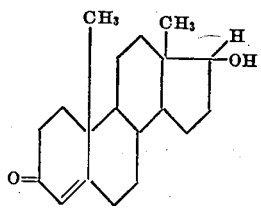

is treated with a propionylating agent.

13. The testosterone-n-butyrate of the formula

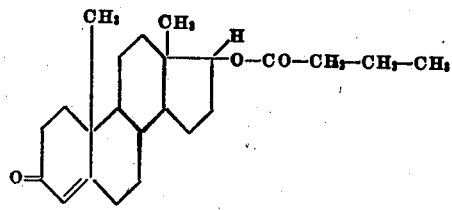

of melting point 111–113° C.

14. The testosterone-n-valerianate of the formula

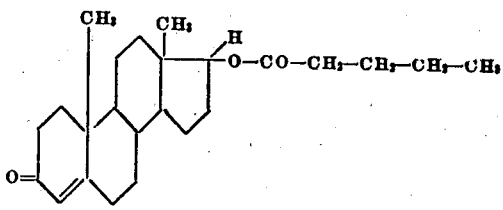

of melting point 109–111° C.

15. A process for the manufacture of testosterone-n-butyrate of the formula

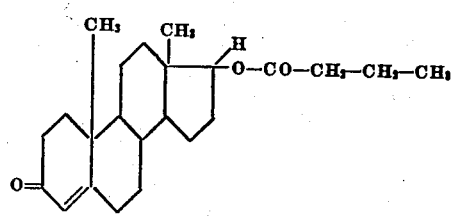

wherein testosterone of the formula

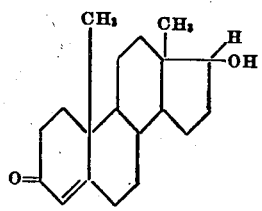

is treated with a n-butyrylating agent.

16. A process for the manufacture of testosterone-n-valerianate of the formula

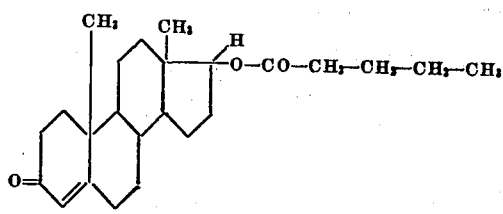

wherein testosterone of the formula

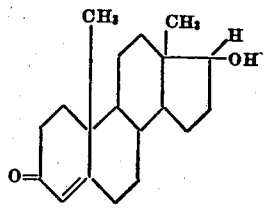

is treated with a n-valerianylating agent.

KARL MIESCHER.
ALBERT WETTSTEIN.
CAESAR SCHOLZ.